United States Patent [19]

Cameron et al.

[11] Patent Number: 4,903,791
[45] Date of Patent: Feb. 27, 1990

[54] FRAME CROSSBEAM ASSEMBLY FOR ALL-WHEEL DRIVE VEHICLE

[75] Inventors: Dugald Cameron, Grosse Pointe Woods, Mich.; Karl Friedrich, Leibnitz, Austria; Klaus Eder; Franz Bachhiesl, both of Graz, Austria

[73] Assignee: Chrysler Motors Corporation, Highland Park, Mich.

[21] Appl. No.: 266,181

[22] Filed: Nov. 2, 1988

[30] Foreign Application Priority Data

Dec. 15, 1987 [AT] Austria ................................. 3299/87

[51] Int. Cl.⁴ .............................................. B60G 3/00
[52] U.S. Cl. ..................................... 180/252; 180/233; 180/905; 280/800; 280/782; 280/796
[58] Field of Search ............... 180/291, 299, 297, 312, 180/252, 233, 905, 144, 79, 79.4; 280/781, 785, 800, 782, 790, 796, 797

[56] References Cited

U.S. PATENT DOCUMENTS

| | | | |
|---|---|---|---|
| 3,135,347 | 6/1964 | Vranyosovics | 280/782 |
| 3,534,977 | 10/1970 | Wessel | 280/800 |
| 4,700,796 | 10/1987 | Morlok et al. | 180/188 |
| 4,708,391 | 11/1987 | Nakano | 296/204 |
| 4,768,808 | 9/1988 | DeRees | 280/796 |

Primary Examiner—Richard A. Bertsch
Attorney, Agent, or Firm—Edward P. Barthel

[57] ABSTRACT

A chassis frame crossbeam assembly for a four wheel drive motor vehicle comprising a lower crossmember and an upper bridge member fixed thereon. The crossmember intermediate portion being downwardly depressed formed with a thinned valley section. The bridge member having a hollow-section including an intermediate bifurcated portion in the form of fore and aft upwardly arched branch sections with end extensions welded on either side of the crossmember thinned valley section. The vertically opposed bridge member branch sections and crossmember depression combine to define a through passage for a longitudinal drive shaft for driving the rear wheels. The bridge member branch sections define a free open channel therebetween adapted to receive a transverse tube portion of the steering assembly therethrough arranged with its principal axis orthogonal to the principal axis of the subjacent longitudinal drive shaft.

1 Claim, 4 Drawing Sheets

4,903,791

FRAME CROSSBEAM ASSEMBLY FOR ALL-WHEEL DRIVE VEHICLE

BACKGROUND OF THE INVENTION

This invention relates to all-wheel drive vehicles and, more particularly, to an arrangement for modifying a chassis frame crossmember of a front transaxle vehicle allowing the vehicle rear axle to be driven by the addition of a power takeoff longitudinal propeller shaft extending rearwardly from the front transaxle.

The U.S. Pat. Nos. 4,582,160 to Weismann et al. and 4,650,028 to Eastman et al. disclose and describe all-wheel drive vehicle power trains having front wheel transaxles. Examples of vehicle powertrains incorporating transverse engine and transaxle arrangements are found in front wheel drive motor vehicles manufactured by Chrysler Motors Corporation starting in 1980. The existing chassis frames for such motor vehicles are designed for a front wheel drive power train. To readily and economically convert such front wheel drive vehicles into all-wheel drive vehicles it was determined that the chassis frame front crossbeam disposed adjacent to the front wheels required modification. Specifically, the modified crossbeam required an opening for the passage therethrough of a longitudinal take-off drive shaft adapted to be connected to a rear wheel driving axle for use in an all-wheel drive vehicle. Additionally the modified front crossbeam must accommodate a transverse portion of the existing front steering assembly.

The U.S. Pat. No. 4,700,796 to Morlok et al. is an of motor vehicle rear axle structure that is especially designed for an all-wheel drive vehicle power train. The U.S. Pat. No. 4,708,391 to Nakano discloses a vehicle body structure in which the rigidity of the frame is increased by reinforcing a thin portion formed thereon.

SUMMARY OF THE INVENTION

It is an object of the present invention to provide a compact and economical arrangement for modifying an existing front wheel drive motor vehicle frame crossmember so that it accommodates a longitudinal power take-off drive shaft of an all-wheel drive power train with a minimum of redesign and fabrication of additional structural components.

It is another object of the present invention to modify the structure of an existing motor vehicle frame crossmember to provide a crossbeam assembly by forming a downwardly bowed thinned valley section in an intermediate portion of the crossmember which, together with the addition of an overlying hollow-section arched bridge member reinforces the thinned valley section while providing a passageway for a power take-off longitudinal propeller drive shaft therethrough for connection to a rear wheel driving axle.

It is still another object of the present invention to provide a crossbeam assembly for a vehicle chassis frame as set forth above wherein the bridge member comprises an integral bifurcated arched portion defining a free transverse channel therebetween adapted to receive a transverse portion of the vehicle steering assembly such that is supported in an orthogonal overlying manner relative to the longitudinal power take-off drive shaft.

The above objects are accomplished in accordance with the invention wherein an intermediate portion of an existing crossmember is formed with a downwardly bowed thinned valley section in longitudinal profile as compared to its remaining crossmember full-thickness end sections on either side of the thinned valley section. A generally sinusoidally shaped upwardly arched hollow-section bridge member reinforces the crossmember valley section with the bridge member having oppositely extending free ends secured to the upper surface of the respective crossmember end sections. The reduction in the vertical dimension at the crossmember at its valley section together with the necessity of supporting the transverse intermediate portion of the steering assembly in an orthogonal manner above the longitudinal drive shaft resulted in the incorporation of the arched reinforcing bridge support member therewith providing the unique composite crossbeam assembly.

The hollow-section bridge member is constructed in the form of upper and lower downwardly and upwardly opening, respective half shells secured together by bonding their peripheral edges into a seam or weld line. The opposed upwardly arched bridge member bifurcated portion and lower downwardly bowed crossmember thinned valley section combine to define a through passage accommodating the power train longitudinal rear wheel drive shaft.

The bridge member arched bifurcated portion in the form of fore and aft branches define a transverse channel therebetween which provides a free space for receiving a transverse intermediate tube portion of the steering assembly. The steering tube transverse portion is removably supported on the bridge member end extensions and is positioned adjacent to and vertically above the longitudinal rear wheel drive shaft. In this way the existing steering and power train rear wheel drive shaft assemblies are accommodated by the composite crossbeam assembly enabling the ready modification of a front wheel drive vehicle into a full-time four-wheel drive vehicle.

BRIEF DESCRIPTION OF THE DRAWINGS

These and other objects and advantages of the instant invention will be more apparent from the following description and the accompanying drawings in which.

DETAILED DESCRIPTION OF THE PREFERRED EMBODIMENT

Figure 1:
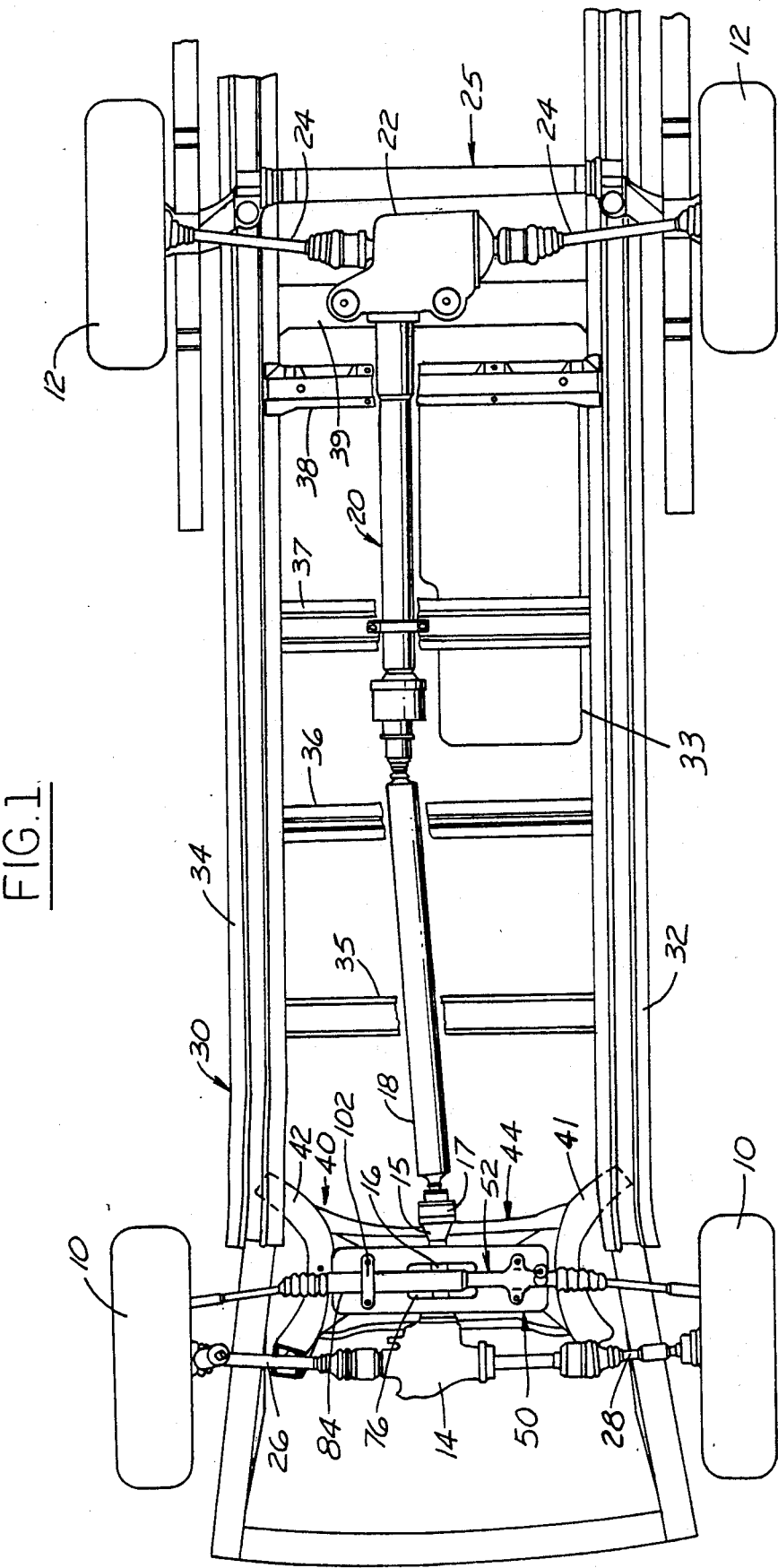
FIG. 1 is a top plan view of a vehicle four-wheel drive chassis frame and power train installation, with parts broken away, according to the invention.

Turning now to the drawings and more particularly to FIG. 1, a vehicle with which the structure of the present invention can be used, includes front and rear sets of wheels 10 and 12, respectively, an engine and automatic or manual transmission (not shown), and a power take-off case 14.

The power take-off case 14 drivably connects the transmission output (not shown) to a longitudinally extending rear axle power take-off shaft 16 universally connected by carden joint 17 to a forward angled propeller shaft assembly 18 and thence to rear longitudinal propeller shaft assembly 20. The rear propeller shaft assembly 20 is connected to a rear axle drive gear unit enclosed in housing 22 rotating half shafts 24 driving the rear set of wheels 12.

A rear axle assembly 25, disclosed in U.S. Pat. No. 4,533,157 issued Aug. 6, 1985, to Hornle et al., is shown supporting the rear wheels 12 provided aft of the gear unit housing 22. The power take-off case 14 includes a front interwheel gear unit (not shown) rotating front half shafts 26 and 28 driving the front set of wheels 10.

Figure 4:
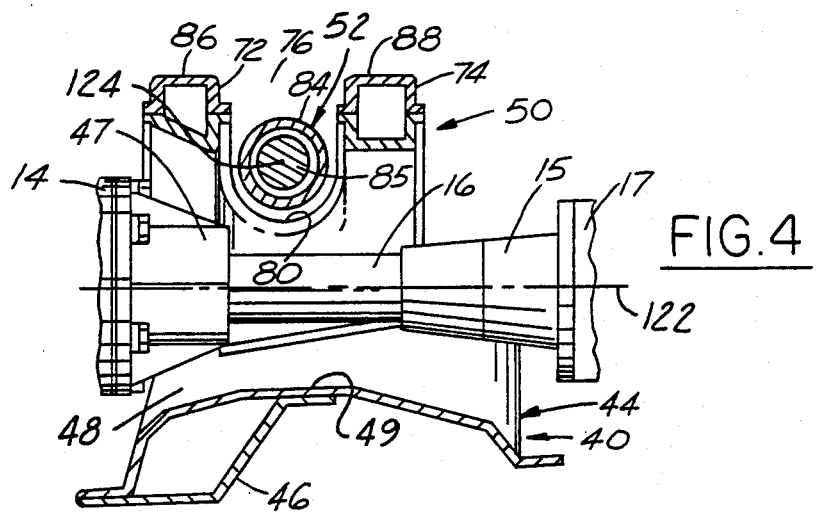
FIG. 4 is a fragmentary cross-sectional view taken substantially on the line 4—4 of FIG. 2, with portions shown in elevation.

As seen in FIG. 1 vehicle frame 30 includes left 32 and right 34 side frame members, in the form of longitudinal box-section rails, interconnected by a series of transverse crossmembers numbered consecutively 35, 36, 37, 38 and 39 from indicated at 40, includes arcuate U-shaped left and right transition members 41 and 42 respectively, interconnected by a central platform-like crossmember 44. FIG. 4 shows the crossmember 44 having an inverted channel-shaped longitudinal section with its leading edge reverse bent to form with a hollow transversely extending box-section 46.

Figure 2:
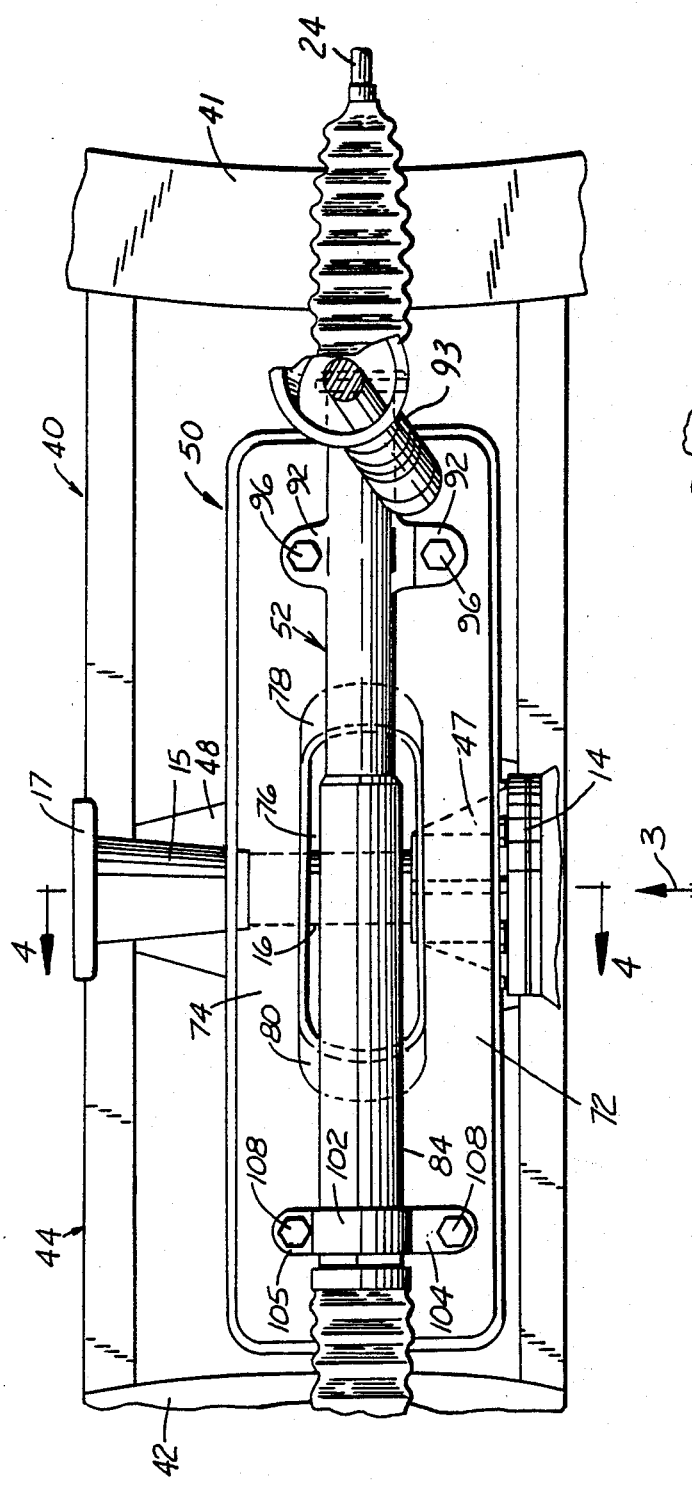
FIG. 2 is an enlarged fragmentary top plan view of the front crossbeam reinforcement bridge shown in FIG. 1.
Figure 3:
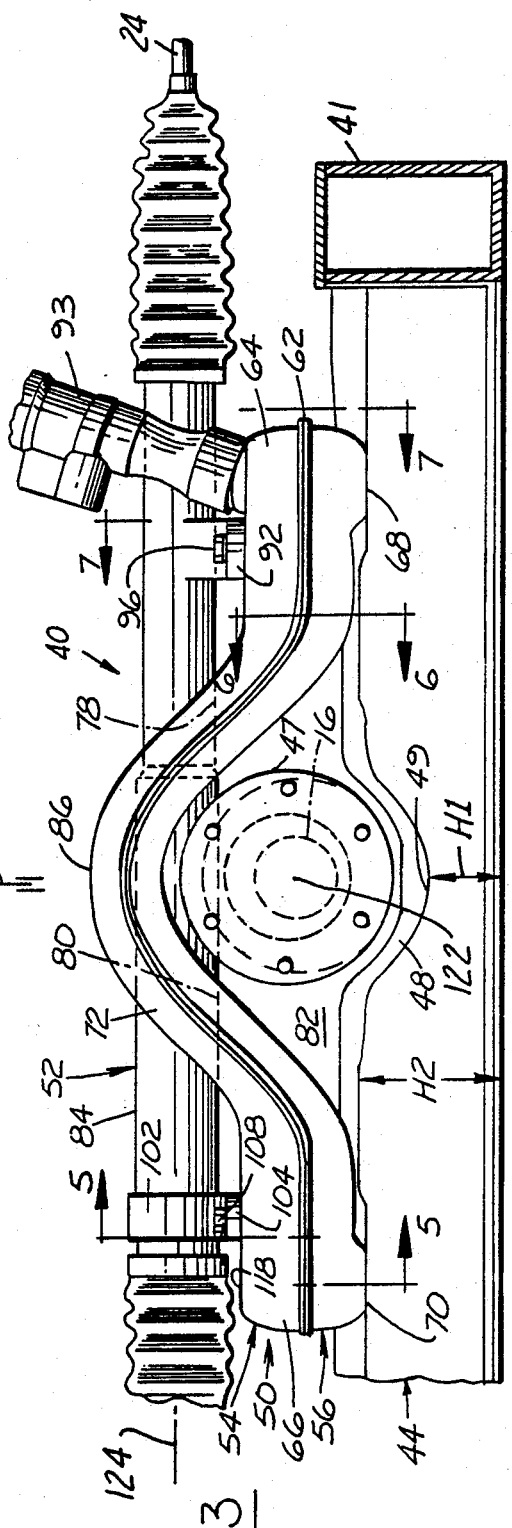
FIG. 3 is a fragmentary side elevational view, partly in section, taken in the direction of arrow "3" in FIG. 2.

With reference to FIGS. 2 and 3, to accommodate the power take-off longitudinal drive shaft portion 16 together with forward connector housing 47 the crossbeam assembly crossmember 44 upper surface is preformed with an upwardly concave arcuate depression 48 as viewed in transverse profile. The depression 48 defines a thinned valley portion 49 (FIG. 3) substantially aligned on the vehicle longitudinally extending vertical plane of symmetry which includes the dimension line "H1". It will be noted that the valley portion 49 has a reduced minimum cross-sectional height "H1" in comparison to the height "H2" of the adjacent outboard portions of the crossmember 44. In the disclosed embodiment the dimension "H1" is about one-half the dimension "H2".

In FIGS. 2 and 3 it will be seen that the crossbeam assembly 40 also comprises a support bridge member, generally indicated at 50, adapted to both reinforce the crossmember thinned valley portion 49 and support a transverse tube portion of front wheel steering assembly 52. The bridge member 50 is in the form of a hollow, sinusoidal-shaped, elongated structural member fabricated of upper 54 and lower 56 half-shells. The upper downwardly opening half-shell 54 and the lower upwardly opening half-shell 56 are secured together by bonding or welding their peripheral flanges 58 and 60, respectively, into a seam or weld line 62 shown in FIG. 5. In the disclosed form the bridge member half-shells 54 and 56 are stamped or otherwise formed from sheet material such as sheet steel.

As seen in FIG. 3 the bridge member 50 comprises outwardly extending co-planer end portions 64 and 66 having their lower half-shell affixed, as by bolt fasteners or welding, to the crossmember 44 at abutting flush surface areas 68 and 70. With reference to FIGS. 2 and 4 it will be seen that the bridge member 50 further comprises an intermediate or central arched bifurcated portion defined by a pair of upwardly bowed fore 72 and aft 74 parallel arched branch sections. The branch sections 72 and 74 define therebetween a transversely oriented free open channel 76 extending between a pair of spaced upwardly concave or U-shaped contoured saddle-shaped portions 78 and 80. It will be noted in FIG. 3 that the crossmember upwardly concave depression 48, together with the sinusoidal shaped pair of bridge arched branch sections 72 and 74, define a passageway 82 through which the longitudinal drive shaft portion 16 extends.

Figure 5:
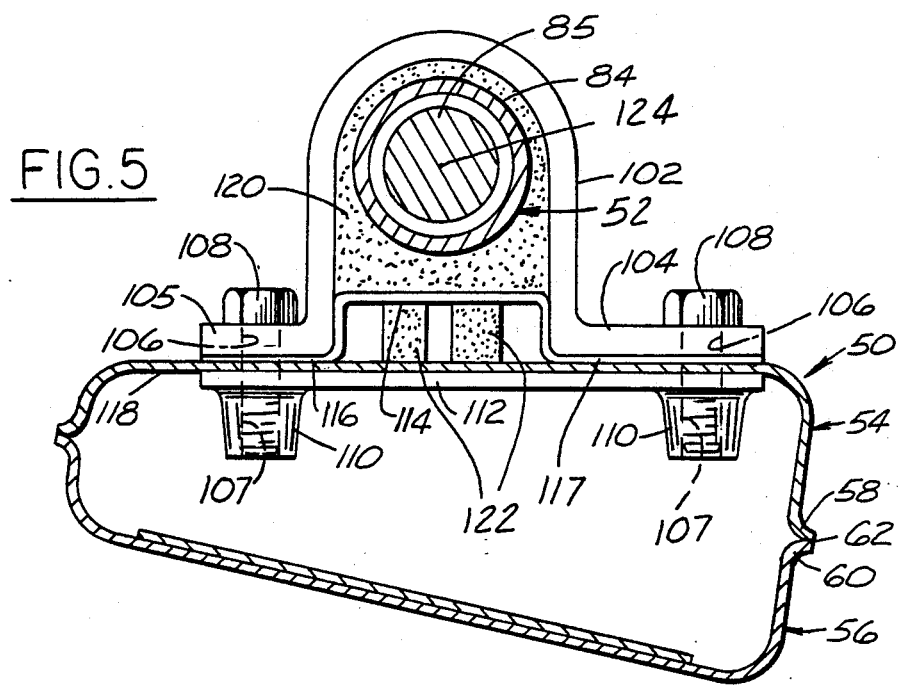
FIG. 5 is an enlarged cross-sectional view of the structural bridge member taken on line 5—5 of FIG. 3.
Figure 6:
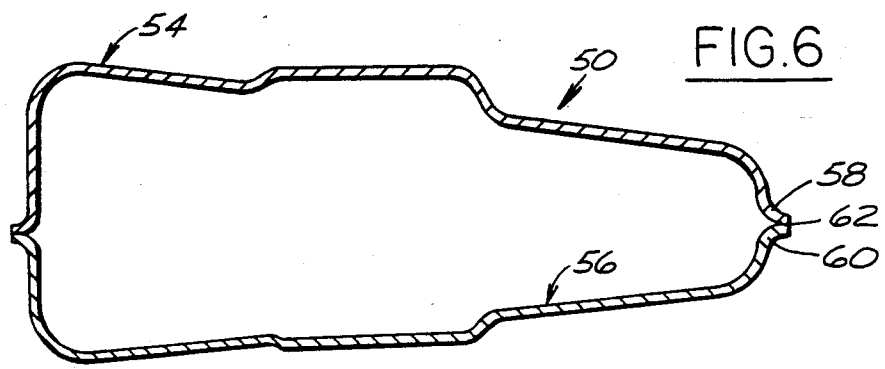
FIG. 6 is an enlarged cross-sectional view of the structural bridge member taken on line 6—6 of FIG. 3.

As best seen in FIGS. 2 and 3 the steering assembly 52 for the vehicle front wheels 10 includes a transversely extending intermediate tubular portion 84 enclosing an inner steering rod 85 (FIG. 5). The steering assembly outer tubular portion 84 is adapted for positioning in the transverse open channel 76. FIGS. 3 and 4 show the steering assembly tubular portion 84 located vertically below peaks 86 and 88 of the arched branch sections 72 and 74, respectively. In this way the bridge member 50 supports the steering assembly transverse tubular portion 84 within the confines of the open channel 76 while allowing is passage therethrough.

Figure 7:
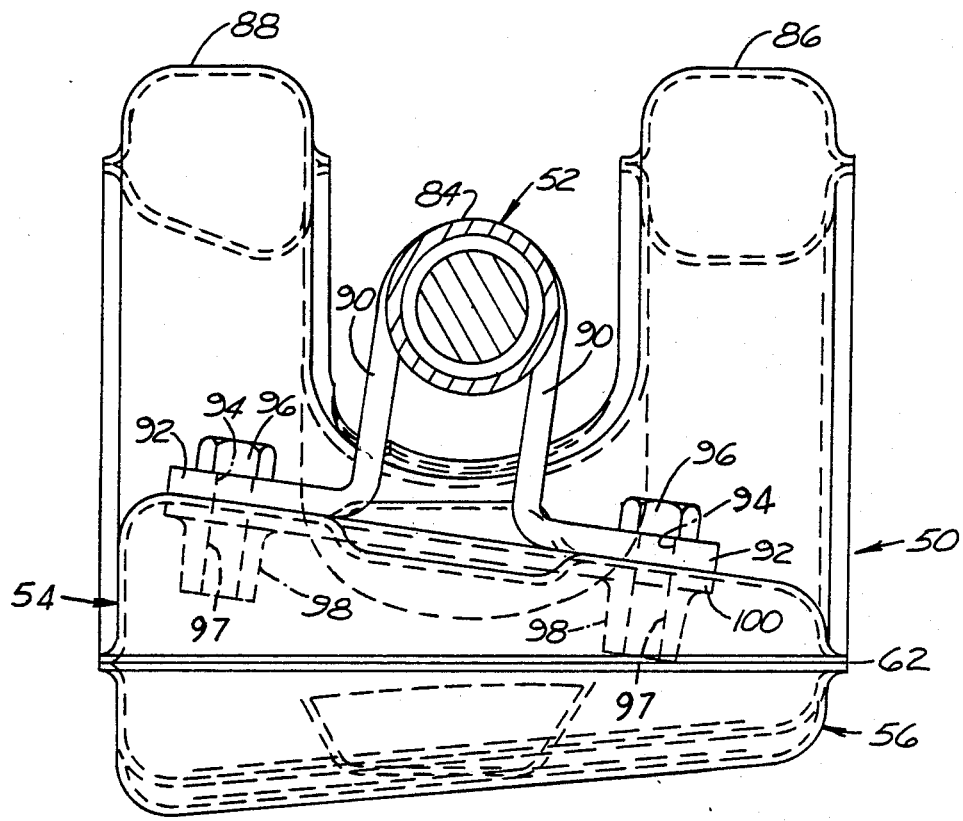
FIG. 7 is an enlarged cross-sectional view taken on the line 7—7 of FIG. 3.

With reference to FIG. 7 the steering tubular portion 84 has its one end secured to the crossbeam assembly bridge member 50 by a pair of integral attachment legs 90, each formed with a right-angled foot 92, adjacent steering column 93 (FIGS. 2 and 3). Each foot 92 has an attachment hole 94 adapted to receive a machine bolt 96 therein for threaded reception in an aligned bore 97 of sockets 98 formed integral with an interior doubler plate 100.

With reference to FIG. 5 a U-shaped bracket 102 is shown positioned over the outer end of the steering tube portion 84 and formed with foot portions 104, 105. The foot portions each include an attachment hole 106 receiving a machine bolt 108 for threaded reception in aligned bore 107 of a socket 110 fixed on the underside of an interior doubler plate 112. A hat-shaped clip 114 is sized for reception within the bracket 102 with clip flanges 116 and 117 sandwiched between the bracket foot portions 104 and 105, respectively, and the horizontal upper wall 118 of the bridge member 50. The clip flanges 116 and 117 have aligned installation holes for reception of an associated bolt 108. A molded elastomeric rubber-like bushing 120 surrounds the steering tube portion 84 and is sized for resiliently holding it within the bracket 102. Elastomeric spacer blocks 122 are retained in a compressed manner between the bridge member wall 118 and the clip 114 to support the bushing 120.

A feature of the invention is that the crossbeam assembly bridge member 50 accommodates the steering assembly transverse tube portion 84 in a nested manner within its open channel 76. In this way the subjacent longitudinal drive shaft 16 and the upper transversely extending steering tube portion 84 are arranged in association with the bridge member 50 with their principal axes in orthogonal relation. Thus, as seen in FIGS. 3, 4, and 5 principal axis 122 of the longitudinal drive shaft portion 16 is oriented at right angles to and below principal axis 124 (FIG. 5) of the steering assembly intermediate tubular portion 84.

Although only one embodiment of the invention has been shown and described, it is apparent that other modifications and embodiments may be made without departing from the spirit and scope of the invention as defined in the appended claims.

What is claimed is:

1. In combination with a four wheel drive vehicle having a front transaxle driving front wheels and a rear axle driving rear wheels, said vehicle having a chassis of the type having a frame including first and second spaced apart longitudinally extending side members, a power train including a longitudinally extending drive shaft assembly drivingly interconnecting said front tranaxle and said rear axle for driving said rear axle wheels, a steering assembly for said front wheels, at least one transversely extending crossbeam assembly rigidly affixed at its opposite ends to an associated one of said frame side members, the improvement wherein said crossbeam assembly comprising:

a lower crossmember formed by sheet stamping and supported between said frame side members formed with an upwardly concave arcuate shaped depression including a thinned valley portion substantially aligned on the longitudinal centerline of said chassis frame;

a transversely positioned upper bridge member formed with a bifurcated portion intermediate its co-planer outwardly directed end extensions with each said end extension affixed to an associated underlying end portion of said lower crossmember, said bifurcated portion in the form of fore and aft longitudinally spaced upwardly arched branch sections, whereby said bifurcated portion overlies said lower crossmember thinned valley section defining a passage therebetween receiving therethrough a longitudinal portion of said drive shaft assembly;

a transverse tube portion of said vehicle steering assembly received in an open channel defined between said upper bridge member fore and aft branch sections with each end of said tube portion attached by bolting to an associated underlying bridge member end extrusion, whereby said steering assembly transverse tube portion is arranged in an orthogonal overlying manner with a portion of said subjacent longitudinal drive shaft;

said upper bridge member formed by sheet stamping into upper and lower half-shells affixed together along associated peripheral flanges establishing a medial seam line which circumscribes said half-shells defining a closed hollow-section structural member;

said upper and lower half-shells forming said upper bridge member fore and aft branch sections structured with each section having associated medial seam portions defining identical substantially sinusoidal shapes in transverse section; and wherein said lower crossmember thinned valley portion being formed with a cross-sectional vertical dimension about one-half the cross-sectional vertical dimension of its adjacent outboard portions.

* * * * *